No. 630,434. Patented Aug. 8, 1899.
W. WIRTZ.
BRAKE.
(Application filed Apr. 26, 1899.)
(No Model.)
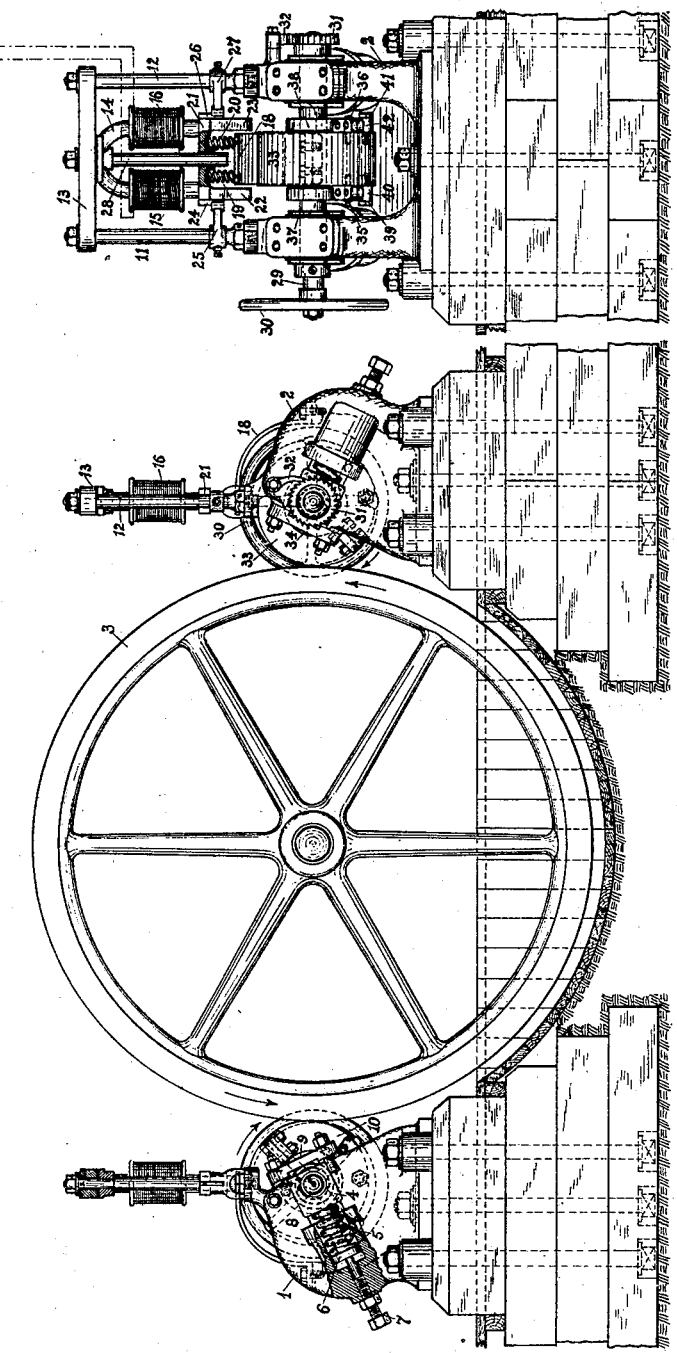
Witnesses:
Gustave Harder.
Johann Reifel
Inventor:
Wilhelm Wirtz
per Martin Schmetz
Attorney.

UNITED STATES PATENT OFFICE.

WILHELM WIRTZ, OF AIX-LA-CHAPELLE, GERMANY.

BRAKE.

SPECIFICATION forming part of Letters Patent No. 630,434, dated August 8, 1899.

Application filed April 26, 1899. Serial No. 714,547. (No model.)

*To all whom it may concern:*

Be it known that I, WILHELM WIRTZ, machinist, a citizen of Germany, residing at Scaufenberg, near Aix-la-Chapelle, Kingdom of Prussia, Germany, have invented certain new and useful Improvements in Brakes for Rotatory Bodies; and I do hereby declare the following to be a full, clear, and exact description of the invention, such as will enable others skilled in the art to which it appertains to make and use the same.

The present invention relates to brakes for rotatory bodies and more especially to such as are used for fly-wheels, and comprises an eccentric device, preferably two eccentrics arranged at the circumference of the wheel diametrically opposite each other, each eccentric having mounted on its circumference an eccentric ring, which after the release of a locking device holding this ring from any part of the apparatus is so turned by means of springs that it comes in contact with the periphery of the fly-wheel, wedging the same in the quickest possible manner between the two eccentric devices and stopping it almost instantaneously without shock, the rings on account of their eccentricity producing the braking power and then in consequence of the increasing pressure due to the rotation of the wheel involving in their rotary movement through friction the eccentrics.

In the accompanying drawings the same numerals of reference indicate the same parts of the invention.

In the drawings, Figure 1 is a side view, and Fig. 2 an end view, of the brake device at the moment of action.

The powerful frames 1 and 2 are heavily bolted down to their respective foundations, and between them the fly-wheel 3 of an engine revolves. The cheeks of said frames contain slots, in which flanged bearings move. Said cheeks contain also recesses for the reception of powerful springs adjustable by means of set-screws.

Fig. 1 shows an arrangement of the above-mentioned details, in which the bearing 4 is provided with a projection surrounded by one end of the powerful spring 5, while the other end of the same spring is similarly connected with the circular plate 6, interposing between the spring and the point of the set-screw 7. Each cheek of the frames 1 and 2 contains a similar arrangement. The shaft 8 carries the eccentric 9, upon which is mounted the eccentric ring 10. In order to create any desired degree of friction between the eccentric ring 10 and the eccentric 9, the former has been provided with a joint held together by bolts. Into the lugs on top of the cheeks of the frames 1 and 2 standards are screwed, which carry traverses, to which the electromagnets are suitably secured.

Fig. 2 shows at a glance the arrangement of the several parts. The standards 11 and 12 carry the traverse 13, to which the horseshoe-shaped core 14 of the electromagnets 15 and 16 is secured. Wires lead to the electric contact 17, which is so adjusted that it will actuate said electromagnets as soon as the velocity of the fly-wheel reaches a certain limit. A curved plate 18, bolted to the rear of the frame, carries at its free end two trunnions purposely to retain the springs 19 and 20, which serve to balance the dead-weight of the armature 21 and its forked arms 22 and 23 in order to enable the electromagnets to exert their entire power to release said forked arms. The outer side of the forked arm 22 is provided with a feather 24, sliding in a slot of the bracket 25, secured to the standard 11, and in a like manner the arm 23 is provided with the feather 26, sliding in a slot of the bracket 27, secured to the standard 12. The guide-bar 28 and said brackets not only guide the armature, but insure a faultless working of the several parts. The shaft 29 carries on one of its free ends a hand-wheel 30 and on its other end a ratchet-wheel 31, controlled by the pawl 32. The eccentric ring 33 corresponds exactly in structure to the eccentric ring 10 and is mounted upon the eccentric 34 on shaft 29. The eccentric ring 33 is provided with the trunnions 35 and 36, against which the spiral springs 37 and 38 press, with the bolt 39 carrying the friction-roller 40 and with the bolt 41 carrying the friction-roller 42. Similar parts are mounted upon the frame 1, and it is thought that the above description of parts will suffice.

The mode of operation is as follows: In order to set the mechanism, the shafts carrying the eccentrics are turned until the line of throw forms with the horizontal center line an angle of about forty-five degrees. The line of throw of the eccentric 9 will point downward and away from the fly-wheel, while the corresponding line of the eccentric 34 points upward and away from said wheel. Hereupon the eccentric rings are turned back until the forked arms of the armatures can be slipped over the friction-rollers pivoted to the sides of said rings, whereby the spiral springs are set at tension. In this position the eccentric rings are slightly removed from the periphery of the fly-wheel. If now from any cause it is required to stop the working of the machine, it can be effected by closing the electric contact 17, whereby the electromagnets are actuated and raise their armatures. In raising the armatures the forks release the eccentric rings, which under the influence of the spiral springs are set in rotation and brought into contact with the rim of the fly-wheel, upon which they will exert a braking action on account of their eccentricity, and on the pressure increasing on the eccentrics the latter will be involved in the rotation, in consequence of which the wheel becomes wedged between the devices and stopped without shock, as the bearings of the shafts are resting on powerful springs.

To release the wheel from the brake, the eccentrics are turned backward by means of the hand-wheels, the eccentric rings returned to their first position, and the armatures lowered, thus resetting the spiral springs and making the devices ready for action again.

It will be understood that various mechanical modifications may be made and the release of the eccentric rings effected by mechanical devices instead of effecting it by means of electricity without departing from the spirit of my invention.

Having now particularly described and ascertained the nature of my invention and in what manner the same is to be performed, I declare that what I claim, and desire to secure by Letters Patent, is—

A brake device for rotatory bodies comprising in combination with two eccentrics arranged diametrically opposite each other about the circumference of the rotatory body, adjustable eccentric rings mounted upon said eccentrics and capable of turning automatically when released from locking devices, spiral springs secured to the shafts of said eccentrics capable of imparting the initial rotatory motion to said eccentric rings, adjustable springs carrying the bearings of said eccentric-shafts and suitable to neutralize the shock, means for annulling the dead-weight of the armatures, means for setting the brake device, means for releasing automatically the eccentric rings, and means for regulating the tension of the spiral springs, substantially as described and illustrated.

In testimony whereof I affix my signature in presence of two witnesses.

WILHELM WIRTZ.

Witnesses:
C. E. BRUNDAGE,
G. SCOTT.